UNITED STATES PATENT OFFICE.

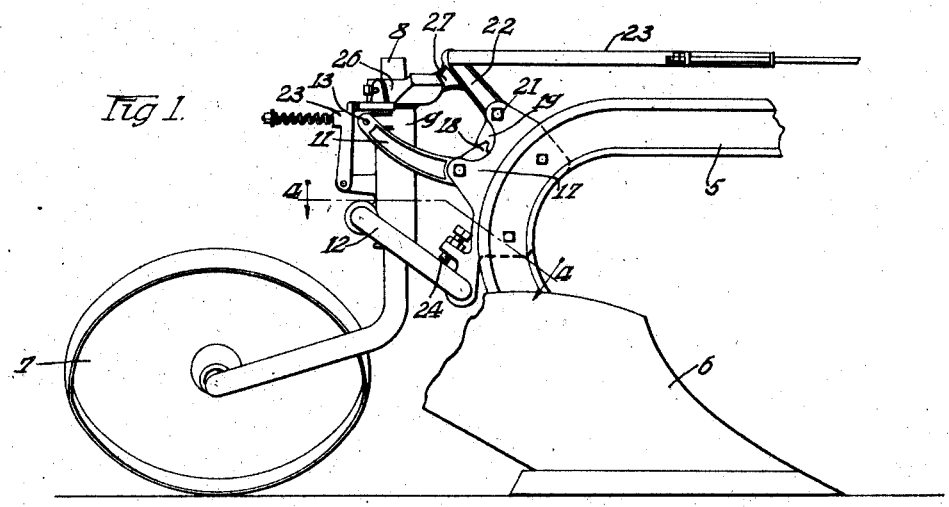
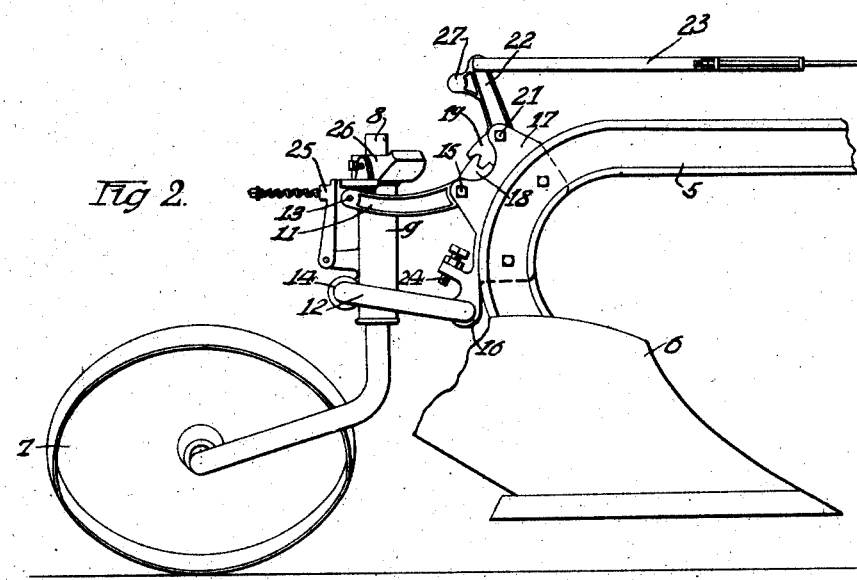
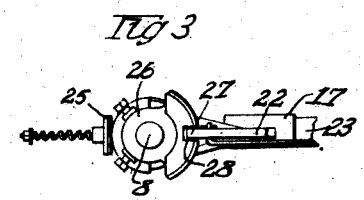
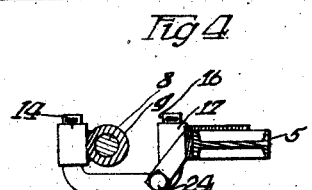

HARRY R. TRAPHAGEN, OF ROCKFORD, ILLINOIS, ASSIGNOR TO EMERSON-BRANTINGHAM COMPANY, OF ROCKFORD, ILLINOIS, A CORPORATION OF ILLINOIS.

POWER-LIFT PLOW.

1,396,793.     Specification of Letters Patent.     Patented Nov. 15, 1921.

Application filed January 19, 1920. Serial No. 352,288.

*To all whom it may concern:*

Be it known that I, HARRY R. TRAPHAGEN, a citizen of the United States, residing at Rockford, in the county of Winnebago and State of Illinois, have invented certain new and useful Improvements in Power-Lift Plows, of which the following is a specification.

This invention pertains in general to plows, and has more particular reference to power lift mechanisms, especially as employed to raise the rear end of a plow frame simultaneously with and by operation of other mechanism for raising the forward end of the frame. The present improvements, however, relate simply to the means for raising and lowering the rear furrow wheel relatively to a plow-carrying frame, for the purpose of lowering and raising the plows to and from operative working position.

Considerable difficulty has been experienced in plow-lifting devices of this kind in the endeavor to provide mechanism of few parts which will effect the desired raising and lowering operation in a most practical and satisfactory manner under all conditions, and which shall be free from such movements as impose considerable frictional resistance tending to wear the parts and increase the power required for operation. I have aimed in the present invention to provide a generally improved lifting mechanism of the character described, with the view to securing with few parts, a construction which is thoroughly practical and requires comparatively little power to operate.

I have further aimed to provide an improved mechanism for raising and lowering the rear end of a plow frame upon and with respect to the rear furrow wheel and which shall automatically lock the rear furrow wheel against castering when the plow is in lowered working position, and which shall permit the wheel to caster when the plow is raised.

Other objects and attendant advantages will be appreciated as the invention becomes better understood by reference to the following description when considered in connection with the accompanying drawings, in which—

Figure 1 is a side elevation of my improvements applied to the rear end of a plow-carrying frame, showing the parts in position with the plow lowered;

Fig. 2, a similar view, but showing the plow raised;

Fig. 3, a plan view of the upper end of the rear furrow wheel spindle and parts appurtenant thereto; and Fig. 4, a detail sectional view taken substantially on the line 4—4 of Fig. 1.

My improvements are especially adapted for use with wheeled plows of the type characterized by a rigid plow-carrying frame supported by front, land and furrow wheels, and a rear furrow wheel, and equipped with power lift mechanism operated by traction of the land wheel for rocking the front wheel cranks to raise and lower the plow frame. Power derived from this mechanism is employed in the present case to operate the lifting mechanism at the rear end of the plow for raising and lowering the same upon and with respect to the rear furrow wheel. It should be noted, however, that my improvements are in no way limited to a use in connection with the particular style of power lift mechanism just described for raising the front end of the plow frame, since any source of power may be employed.

In the present instance, the plow frame is represented by a plow beam 5 which carries a moldboard plow 6. The plow beam 5 may be considered part of the plow frame, which in some instances carries two or more plow bottoms, of which the plow 6 is the rearmost. The rear end of such frame is carried by a suitable rear furrow wheel 7 attached to the frame through the agency of an upright spindle 8 and other parts which will be presently described. Upon the spindle 8 is mounted a sleeve bracket 9 held against lengthwise movement on the spindle but permitting rotative movement thereof, so that a rear furrow wheel may caster under certain conditions. The sleeve bracket is attached to the plow frame through the agency of a pair of substantially parallel links 11 and 12, which are pivotally attached at their rear ends 13 and 14 respectively, to the sleeve bracket and at their forward ends at 15 and 16 to a bracket 17 bolted to the plow beam 5. The lower link 12 is in the form of relatively heavy U-shaped rods, the ends of which have comparatively long transverse bearings in the brackets 9 and 17, as shown plainly in Fig. 4. The upper link 11 is in the form of a casting having a bifurcated end straddling the sleeve 9 so as to engage the latter at both sides and assist in steadying and holding the same in upright position. Formed integral with the link 11 is a segmental gear 18, with which meshes a segmental gear 19 pivoted at 21, to the bracket 17 and formed integral with an upstanding arm 22 adapted to be swung forwardly and backwardly by suitable power-operated mechanism through the agency of the connection 23. When the arm 22 is swung forwardly by pulling on the connection 23, it will be manifest that this force will be transmitted through the segmental gears, causing the plow frame to be lifted by swinging the links 11 and 12 upon the fulcra of their rear ends. The raised position of the plow, shown in Fig. 2, is maintained by holding the connection 23, and when it is desired to lower the plow said connection is released, permitting the rear end of the plow frame to drop until limited by contact of the adjustable stop 24 against the link 12. By adjusting this stop 24, the depth of plowing may be varied, although the principal means of adjustment for varying the depth of plowing is not shown in the present drawings, because it is obtained by adjustment of the front land and furrow wheels with respect to the plow frame.

It is desired that the rear furrow wheel shall be free to caster when the plow is raised, as during transportation, but to yieldingly oppose such castering to a certain extent so as to hold the wheel in alinement when backing. Hence a yielding resistance is imposed to prevent too free castering of the rear furrow wheel, consisting preferably of a spring-pressed block 25 urged against a collar designated generally by 26, secured to the spindle 8. It is further desired to positively lock the rear furrow wheel against castering when the plow is in action, for reasons well known in this art, and this result I obtain automatically upon lowering the plow to working position. To this end, I shape the arm 22 to provide a part 27 adapted to engage in a notch 28 (Fig. 3) formed in the collar 26, such locking engagement being effected upon moving the plow to working position, as shown in Fig. 1. It will thus be obvious that by operation of the connection 23, the plow is raised and lowered and the rear furrow wheel is locked and unlocked against castering.

From the foregoing, it will be observed that the operating parts between the spindle bracket and plow frame for raising and lowering the latter, are positively connected so that there is no chance for relative displacement of these parts under any circumstances, such as might be occasioned by passing over unusual obstructions or by backing when in one or the other extreme operative position. It will be further observed that the segmental gear member 22 has a comparatively small operating movement, especially so, considering the distance of its outer end from the slot when the plow is raised. This distance, however, is taken up by relative movement between the plow frame and sleeve 9, by reason of the parallel link connection between these parts, which causes the center 21, and consequently the member 22, to be lowered considerably, thus bringing the member 22 into closer proximity to the notched member 26 while said member 22 is swung rearwardly. By reason of this arrangement, a maximum plow raising and lowering movement is obtained together with the furrow-wheel locking effect, with comparatively small movement of the operating member 22.

It is believed that the foregoing conveys a clear understanding of my improvements, and while I have illustrated and described but a single preferred working embodiment thereof, it should be understood that various changes might be made in the construction and arrangement without departing from the spirit and scope of the invention as expressed in the appended claims, in which—

I claim:

1. In a plow, the combination of a plow carrying frame, a rear furrow wheel having an upright spindle about which the furrow wheel is adapted to caster, means operative between the frame and said spindle for moving the frame vertically upon and with respect to the rear furrow wheel, including a link pivotally connected at its forward end to the plow frame and at its rear end with the spindle and having a segmental gear, a segmental gear pivotally mounted on the frame and meshing with the first mentioned segmental gear and having an upstanding arm adapted to be oscillated for raising the plow frame, and means operative between said upstanding arm and the spindle for locking the latter against castering movement when the plow is lowered.

2. In a plow, the combination of a frame adapted to carry a plow, a rear furrow wheel having an upright spindle, a sleeve in which said spindle is adapted to rotate, upper and lower links respectively pivotally connected at their forward ends to the frame and at their rear ends to the sleeve, upon which links the plow frame may be moved vertically with respect to the rear furrow wheel, one of said links having a segmental gear, a segmental gear meshing with that on said link and having an upstanding arm, means for oscillating said upstanding arm to effect raising and lowering of the plow-carrying frame, and means operative between said arm and spindle for locking the latter against castering when the arm is in a plow-lowered position.

3. In a plow, the combination of a plow-carrying frame, a rear furrow wheel having an upright spindle about which the wheel is adapted to caster, means connecting said spindle with the frame comprising a pair of substantially parallel links, one above the other, upon which the plow frame is adapted to swing vertically in a substantially parallel movement, a segmental gear fixed to one of the links, a segmental gear member pivotally mounted on the frame and meshing with the link segment and adapted to be oscillated for raising the plow frame, the wheel being capable of castering when the plow is raised, and means for automatically locking the wheel against castering when the plow is lowered.

4. In a plow, the combination of a plow-carrying frame, a carrying wheel having an upstanding spindle, a sleeve bracket on said spindle held against lengthwise movement thereon, but permitting rotation of the spindle therein, a lower link pivotally connecting the lower end of the sleeve bracket with said plow-carrying frame, an upper link pivotally mounted on the plow-carrying frame and having a bifurcated end straddling said sleeve and pivotally connected thereto, said links being arranged in substantially parallel relation, the upper link having formed integrally therewith a segmental gear, a segmental gear pivotally mounted on the plow-carrying frame, and means for oscillating the latter segmental gear for raising and lowering the plow-carrying frame upon and with respect to the carrying-wheel.

5. In a plow, the combination of a plow-carrying frame, a carrying wheel having an upright spindle, a sleeve bracket mounted on the spindle, and means operative between the frame and sleeve bracket for raising and lowering the frame upon and with respect to the carrying wheel, comprising a U-shaped link, the forward and rear ends of which are journaled in bearings secured to the plow-carrying frame and the sleeve bracket, an upper link pivotally attached at its forward and rear ends to the plow-carrying frame and the sleeve bracket and equipped with a segmental gear, a segmental gear meshing with the segmental gear on said link, means for oscillating the second mentioned segmental gear to raise and lower the plow-carrying frame, and an adjustable stop carried by the plow-carrying frame and engageable with the first mentioned link between the end bearings thereof for limiting the lowering movement of the plow carrying frame.

HARRY R. TRAPHAGEN.